United States Patent
Nozaki

(10) Patent No.: US 8,664,798 B2
(45) Date of Patent: Mar. 4, 2014

(54) SEMICONDUCTOR INTEGRATED CIRCUIT DEVICE AND POWER SUPPLY CIRCUIT

(75) Inventor: Ken Nozaki, Miyazaki (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 451 days.

(21) Appl. No.: 12/691,764

(22) Filed: Jan. 22, 2010

(65) Prior Publication Data
US 2010/0194201 A1    Aug. 5, 2010

(30) Foreign Application Priority Data
Jan. 30, 2009   (JP) ................................. 2009-019897

(51) Int. Cl.
*H02J 1/00*    (2006.01)
(52) U.S. Cl.
USPC ................................. 307/80; 307/43; 307/81
(58) Field of Classification Search
USPC ............................................. 307/80, 43, 81
See application file for complete search history.

(56) References Cited

U.S. PATENT DOCUMENTS

| | | | | |
|---|---|---|---|---|
| 6,737,839 | B2 * | 5/2004 | Hiraki et al. | 323/268 |
| 6,995,995 | B2 * | 2/2006 | Zeng et al. | 363/60 |
| 7,765,418 | B2 * | 7/2010 | Mann et al. | 713/320 |
| 2006/0139828 | A1 * | 6/2006 | Ozawa et al. | 361/90 |
| 2008/0061749 | A1 * | 3/2008 | Kato | 323/233 |
| 2008/0106965 | A1 | 5/2008 | Hirobe | |
| 2008/0157733 | A1 * | 7/2008 | Williams | 323/266 |
| 2009/0059630 | A1 * | 3/2009 | Williams | 363/60 |

FOREIGN PATENT DOCUMENTS

| | | |
|---|---|---|
| JP | 06-020472 | 1/1994 |
| JP | 06-149395 | 5/1994 |
| JP | 07-038056 | 2/1995 |
| JP | 2008-140531 A1 | 6/2008 |

OTHER PUBLICATIONS

Japanese Office Action dated Jul. 2, 2013.

* cited by examiner

*Primary Examiner* — Rexford Barnie
*Assistant Examiner* — Toan Vu
(74) *Attorney, Agent, or Firm* — Volentine & Whitt, PLLC

(57) ABSTRACT

A semiconductor integrated circuit device includes a power supply circuit that generates one or more internal supply voltages from an external supply voltage, and one or more functional circuits that operate on the one or more internal supply voltages. A step-down converter in the power supply circuit generates one or more stepped-down voltages from the external supply voltage. A control circuit in the power supply circuit compares the external supply voltage with a reference voltage and selects the internal supply voltages from among the external supply voltage and the stepped-down voltages according to the result of the comparison. The semiconductor integrated circuit device can accordingly operate on different external power supplies, and can continue to operate on battery power even if the battery voltage drops.

18 Claims, 6 Drawing Sheets

SEMICONDUCTOR INTEGRATED CIRCUIT DEVICE AND POWER SUPPLY CIRCUIT

BACKGROUND OF THE INVENTION

1. Field of the Invention

The present invention relates to a power supply circuit, and to a semiconductor integrated circuit device including the power supply circuit and a functional circuit powered by the power supply circuit.

2. Description of the Related Art

As the functionality of battery-powered electronic devices such as calculators, watches, and electronic toys keeps increasing, their power consumption also increases, making it necessary to take steps to extend their battery life. These steps include reducing the current consumption of their integrated circuit chips and in particular their microcomputer chips, through measures taken in the circuit design, layout design, and manufacturing stages.

In Japanese Patent Application Publication No. H7-38056, Uchiyama et al. disclose a semiconductor integrated circuit device with an embedded power supply circuit that receives an external supply voltage and generates an internal supply voltage suitable for the operating speed of the internal circuits of the device, and for the threshold voltage of the metal-oxide-semiconductor field-effect transistors in the internal circuits, so that the internal circuits can operate economically on the minimum necessary voltage despite variations in temperature, manufacturing process conditions, and other conditions.

Paragraph 0017 in the above publication describes a semiconductor integrated circuit device with a battery voltage detection circuit that compares a battery voltage with a reference voltage to be supplied to the logic circuits in the device, and a step-up/step-down voltage converter that steps the battery voltage up or down if it deviates too far from the reference voltage.

A problem with these conventional voltage conversion schemes is that the semiconductor integrated circuit devices used in many of today's products include a variety of circuits and their power requirements cannot always be determined from their operating speed. For example, there may be input-output (I/O) circuits with particular startup requirements and external interface requirements, oscillator circuits that do not require much voltage but are normally kept running constantly, and logic circuits that leak large amounts of current if operated at too low a voltage. It is unreasonable to control the power supply to all such circuits according to a single reference voltage or operating speed.

SUMMARY OF THE INVENTION

An object of the present invention is to supply power at voltages suitable for a variety of functional circuits in a semiconductor integrated circuit device and simultaneously to reduce the current consumption of the semiconductor integrated circuit device, thereby extending battery life.

Another object is to enable a semiconductor integrated circuit device to operate on a battery that is providing less than the expected voltage.

Another object of the invention is to enable a semiconductor integrated circuit device to operate on various different power sources.

A semiconductor integrated circuit device according to the present invention includes a power supply circuit for generating one or more internal supply voltages from an external supply voltage, and one or more functional circuits that operate on the one or more internal supply voltages. A step-down converter in the power supply circuit generates one or more stepped-down voltages from the external supply voltage. A control circuit in the power supply circuit compares the external supply voltage with a reference voltage and selects the one or more internal supply voltages from among the external supply voltage and the one or more stepped-down voltages according to the result of the comparison. The control circuit may also select the one or more internal supply voltages according to a signal that indicates whether the one or more functional circuits are operating in a mode that draws a comparatively large amount of current.

When the external supply voltage is higher than the reference voltage, the control circuit can reduce current consumption by selecting a comparatively low stepped-down voltage for each functional circuit that can operate at such a voltage. When the external supply voltage is lower than the reference voltage, in which condition the stepped-down voltages are also lowered, the control circuit can enable the semiconductor integrated circuit device to keep operating by selecting higher stepped-down voltages, or by selecting the external supply voltage.

For a battery-powered semiconductor integrated circuit device, the present invention extends the battery life both by reducing current consumption, so that the battery discharges more slowly, and by enabling operation to continue when the battery charge runs low and the battery output voltage drops.

The invention also enables a semiconductor integrated circuit device to operate reliably on batteries or other power sources with various different voltage ratings.

DETAILED DESCRIPTION OF THE INVENTION

Figure 1:
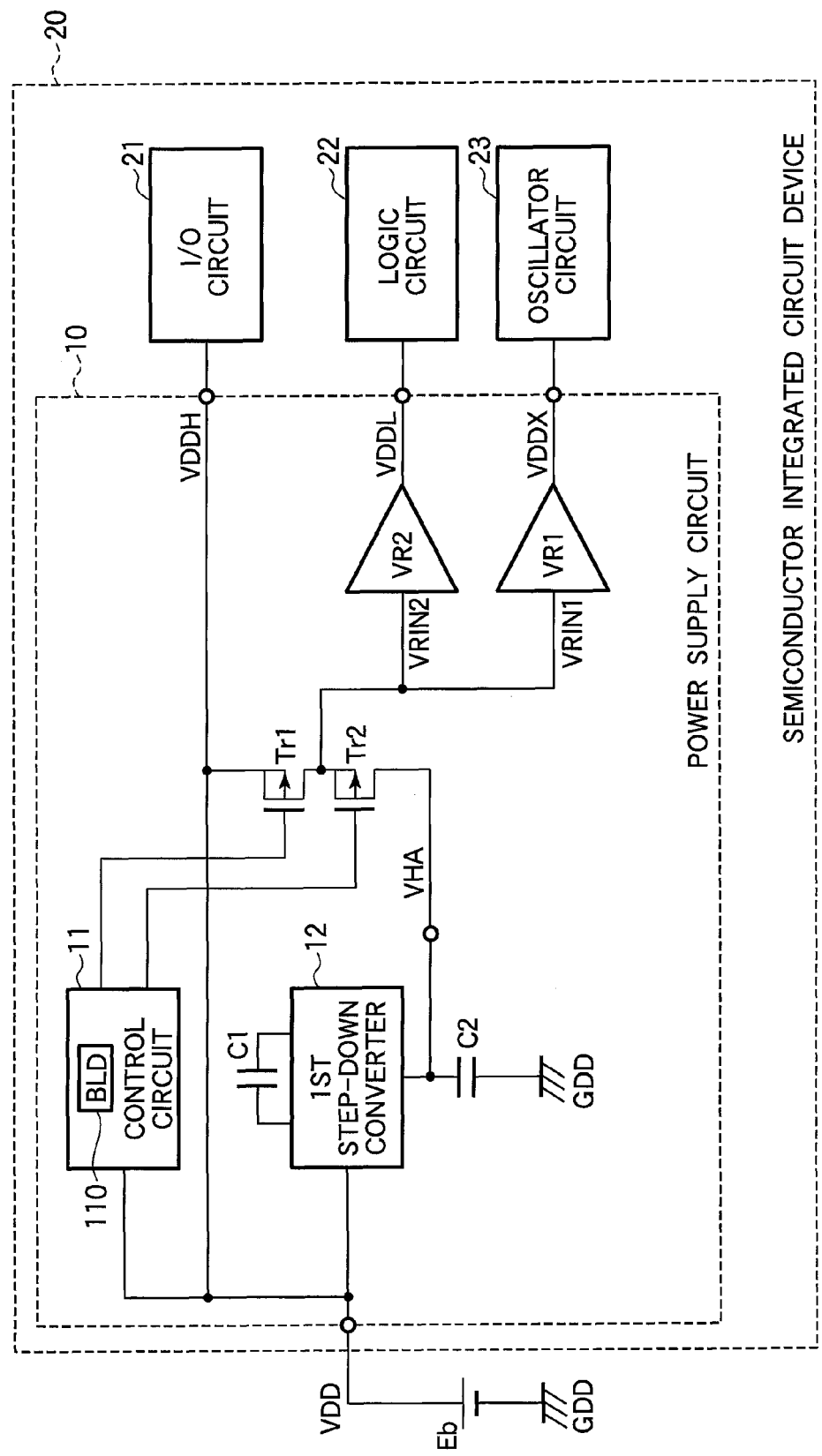
FIG. 1 is a block diagram showing the overall structure of a semiconductor integrated circuit device including a power supply circuit in a first embodiment of the invention.

Embodiments of the invention will now be described with reference to the attached drawings, in which like elements are indicated by like reference characters.

First Embodiment

Referring to FIG. 1, the semiconductor integrated circuit device 20 in the first embodiment includes at least one power supply circuit 10 and a plurality of functional circuits. The exemplary functional circuits shown in the drawing are an input-output (I/O) circuit 21, a logic circuit 22, and an oscillator circuit 23, but the invention is not limited to these three circuits. There may be any number of functional circuits, carrying out different functions and capable of operating over different voltage ranges.

The power supply circuit 10 receives power supplied from an external battery Eb connected between the external voltage terminal VDD and the ground terminal GDD of the semiconductor integrated circuit device 20 and supplies power to the I/O circuit 21, logic circuit 22, and oscillator circuit 23 through respective internal voltage terminals VDDH, VDDL, and VDDX.

The power supply circuit 10 includes a control circuit 11, a first step-down converter 12, a pair of p-type metal-oxide-semiconductor field-effect transistors (P-MOSFETs) Tr1, Tr2, and a pair of voltage regulators VR1, VR2. The control circuit 11 includes a battery level detector (BLD) 110. The voltage output by the battery Eb is supplied from the external voltage terminal VDD to the control circuit 11, the first step-down converter 12, and the internal voltage terminal VDDH that powers the I/O circuit 21.

Although the external voltage terminal VDD and internal voltage terminal VDDH are denoted by different reference characters, they are directly interconnected and both input and output the same voltage (VDD). The configuration in FIG. 1 may therefore be modified so that voltage terminals VDD and VDDH are combined into a single common terminal and the battery voltage is supplied directly through this common terminal to the I/O circuit 21.

The control circuit 11 outputs control signals to the gates of transistors Tr1 and Tr2 to switch transistors Tr1 and Tr2 on and off. The first step-down converter 12 is a switched capacitor voltage converter with a step-down ratio of one-half; it inputs the voltage supplied from the external voltage terminal VDD and outputs a halved voltage to a voltage terminal VHA. The first step-down converter 12 is connected to a charging capacitor C1 and to one plate of a smoothing capacitor C2. The other plate of the smoothing capacitor C2 is connected to ground.

Transistor Tr1 has its source connected to the external voltage terminal VDD and transistor Tr2 has its drain connected to voltage terminal VHA. The drain of transistor Tr1 and the source of transistor Tr2 are interconnected at a node connected to the input terminal VRIN2 of voltage regulator VR2 and the input terminal VRIN1 of voltage regulator VR1.

Voltage regulator VR2 receives the voltage supplied to its input terminal VRIN2 and supplies a regulated voltage through voltage terminal VDDL to the logic circuit 22. Voltage regulator VR1 receives the voltage supplied to its input terminal VRIN1 and supplies a regulated voltage through voltage terminal VDDX to the oscillator circuit 23.

Figure 2:
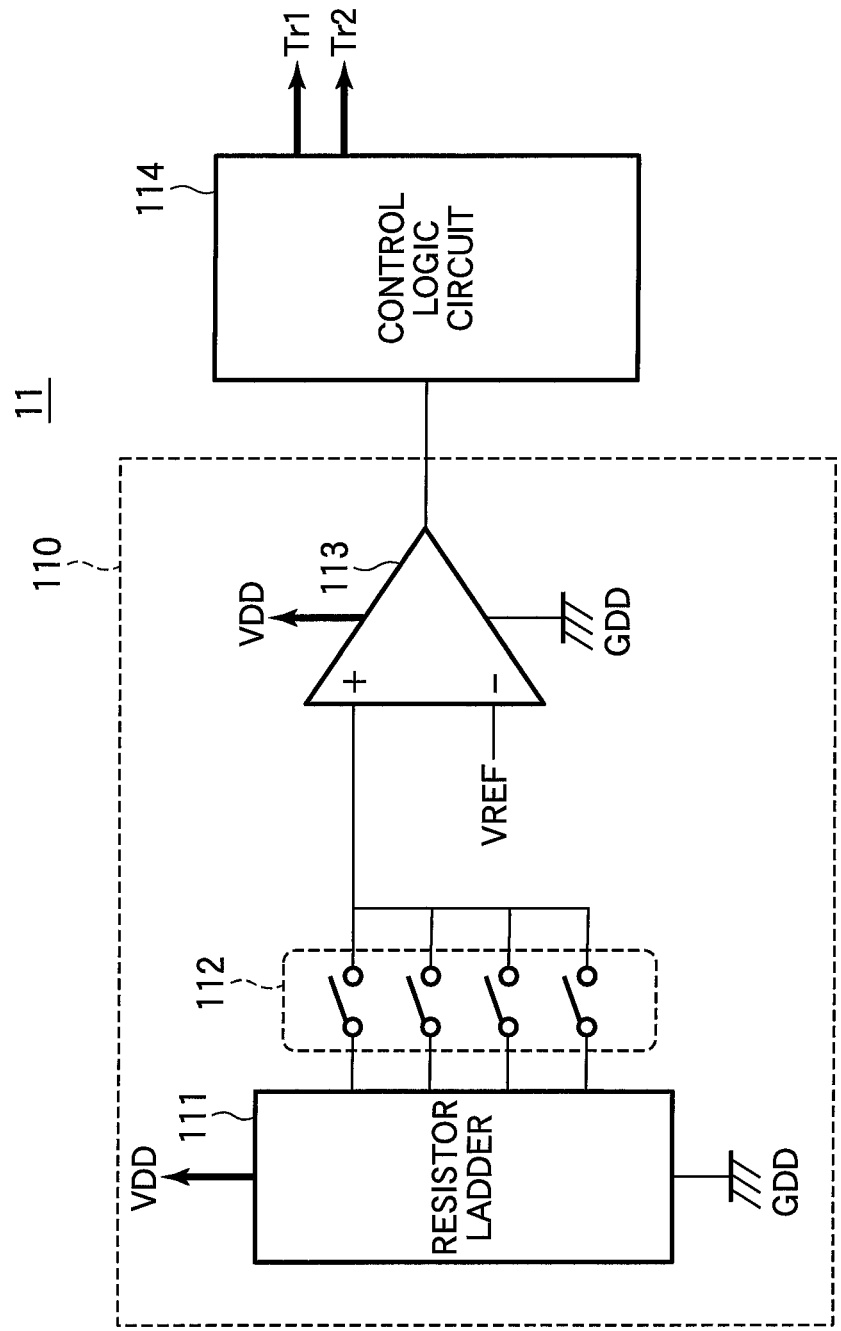
FIG. 2 is a block diagram illustrating the internal structure of the control circuit in FIG. 1.

Referring to FIG. 2, the battery level detector 110 in the control circuit 11 includes a resistor ladder 111, a voltage tapping circuit 112, and a comparator 113, and the control circuit 11 also includes a control logic circuit 114. The resistors in the resistor ladder 111 divide the voltage supplied from the external voltage terminal VDD and supply various divided voltages to the voltage tapping circuit 112. The voltage tapping circuit 112 includes switches that can supply a selected one of these divided voltages to the non-inverting input terminal of the comparator 113. The inverting terminal of the comparator 113 receives a basic reference voltage VREF. The voltage (VDD) supplied from the external voltage terminal VDD can be compared with VREF and various other reference voltages by closing different switches in the voltage tapping circuit 112. For example, if the basic reference voltage is 1.3 V, then VDD can be compared with a reference voltage of 2.6 V by closing the switch that selects a divided voltage equal to VDD/2. The control logic circuit 114 outputs control signals to the gates of transistors Tr1 and Tr2 in accordance with comparison results output from the comparator 113.

In the first embodiment, the control circuit 11 uses its battery level detector 110 to compare the voltage level currently being supplied to the external voltage terminal VDD (which may vary from 0 to 3 V, for example) with essentially a single predetermined reference level (such as 2.6 V). If the VDD level is higher than the reference level, the control circuit 11 outputs control signals that switch transistor Tr1 off and transistor Tr2 on. If the VDD level is not higher than the reference level, the control circuit 11 outputs control signals that switch transistor Tr1 on and transistor Tr2 off.

The control logic circuit 114 may also control the switches in the voltage tapping circuit 112 and adjust the reference voltage to avoid frequent on-off switching of transistors Tr1 and Tr2 when the battery voltage is near the threshold level.

Figure 3A:
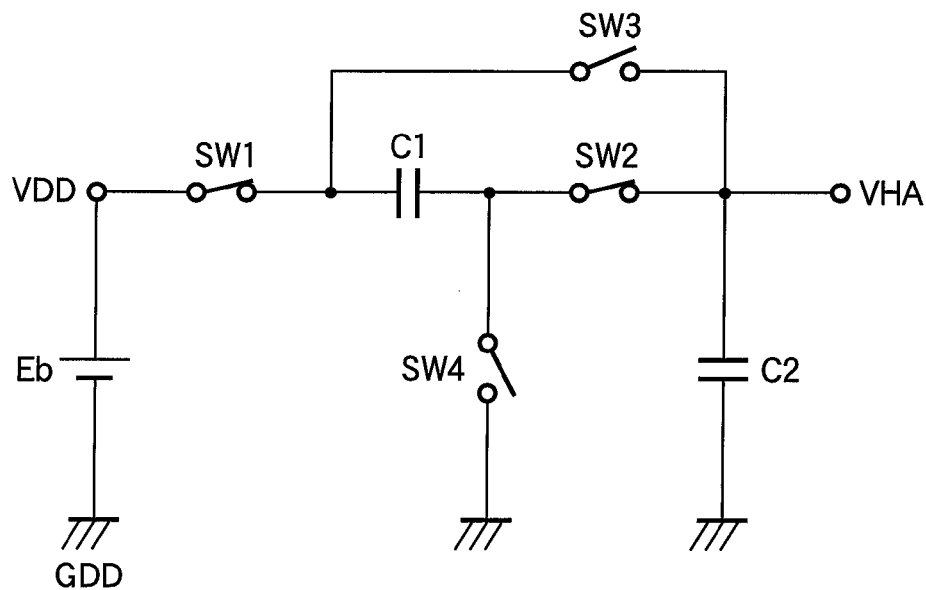
FIG. 3A is a circuit diagram of the first step-down converter in FIG. 1 with switches set for charging.
Figure 3B:
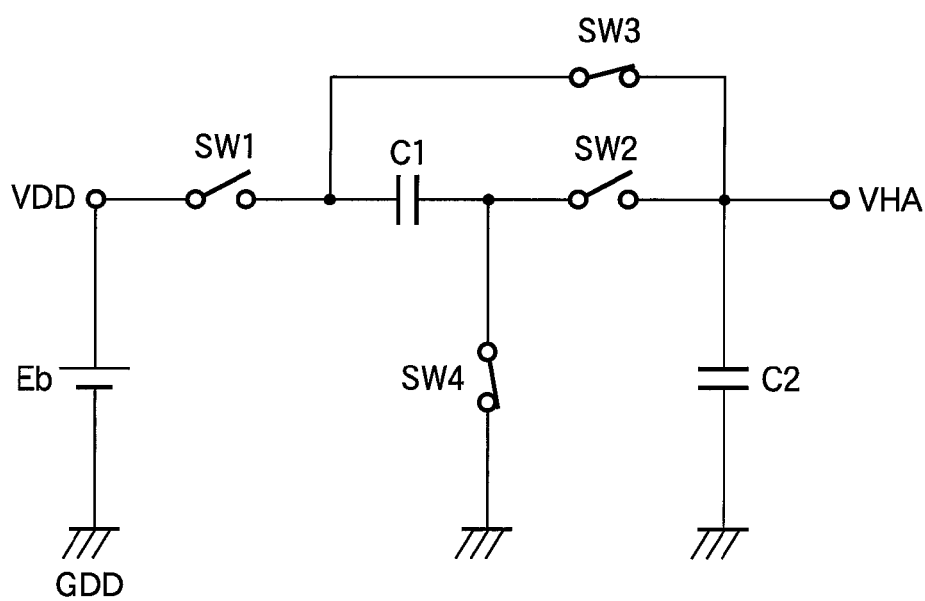
FIG. 3B is a circuit diagram of the first step-down converter in FIG. 1 with switches set for smoothing.

Referring to FIGS. 3A and 3B, the first step-down converter 12 includes four switches SW1 to SW4 connected as shown between voltage terminals VDD and VHA, capacitors C1 and C2, and ground. The battery Eb is connected between voltage terminal VDD and ground as in FIG. 1. The charging capacitor C1 has one plate connected to switch SW1 and the other plate connected to switch SW2, and is connected in series with these switches SW1, SW2 between voltage terminals VDD and VHA. The smoothing capacitor C2 is connected in series between voltage terminal VHA and ground. The node at which switch SW1 and the charging capacitor C1 are interconnected is connected through switch SW3 to voltage terminal VHA. The node at which switch SW2 and the charging capacitor C1 are interconnected is connected through switch SW4 to ground.

Initially all switches SW1 to SW4 are open (turned off). When the switching operation of the first step-down converter 12 starts, first switches SW1 and SW2 are closed (turned on), and the charging capacitor C1 is connected to voltage terminals VDD and VHA as in FIG. 3A. In this state the charging capacitor C1 and smoothing capacitor C2 are in series with the battery Eb and form a capacitive voltage divider, so that the capacitor plates of capacitors C1 and C2 that are connected to voltage terminal VHA are both charged to a potential equal to VDD/2. Next, switches SW1 and SW2 are opened and switches SW3 and SW4 are closed as shown in FIG. 3B. One plate of the charging capacitor C1 is rapidly pulled down from VDD/2 to the ground potential through switch SW4, so the other plate, which is now connected to voltage terminal VHA, is pulled down from VDD to VDD/2, and voltage terminal VHA continues to receive a voltage equal to one-half VDD from both capacitors C1 and C2, which are now connected in parallel between voltage terminal VHA and ground. These switching operations are repeated in synchronization with a clock signal generated by a clock signal generator (not shown) to supply voltage terminal VHA with a voltage equal to half the input voltage VDD.

The overall operation of the power supply circuit 10 will now be described with reference again to FIG. 1. The I/O circuit 21 is always driven at the battery voltage level, which is supplied from voltage terminal VDDH. The control circuit 11 detects the battery voltage level. If the battery voltage is sufficiently high, that is, if the battery Eb has sufficient remaining charge to maintain a voltage level above the reference level set in the battery level detector 110, transistor Tr2 is switched on and transistor Tr1 is switched off to supply the halved voltage from voltage terminal VHA to the two voltage regulators VR1, VR2. As long as the battery remains adequately charged, accordingly, the first step-down converter 12 reduces current consumption by reducing the voltage supplied to the voltage regulators. Current consumption can also be further reduced by designing the voltage regulators to supply appropriate voltages that may be lower than the VHA level to the oscillator circuit 23 and logic circuit 22.

When the remaining charge in the battery runs low and the battery voltage drops below the reference level, the control circuit 11 switches transistor Tr2 off and transistor Tr1 on to supply the voltage from voltage terminal VDD to the two voltage regulators VR1, VR2. Voltage regulator VR1 continues to supply a constant voltage, lower than the VDD level, through voltage terminal VDDX to the oscillator circuit 23. Voltage regulator VR2 likewise supplies a constant voltage lower than the VDD level through voltage terminal VDDL to the logic circuit 22. Consequently, even when the battery Eb is somewhat run down, the functional circuits continue to operate normally, because their voltage regulators now receive the battery voltage from voltage terminal VDD instead of the stepped-down voltage supplied by the first step-down converter 12. Current consumption remains low because the battery voltage itself is low.

Figure 4:
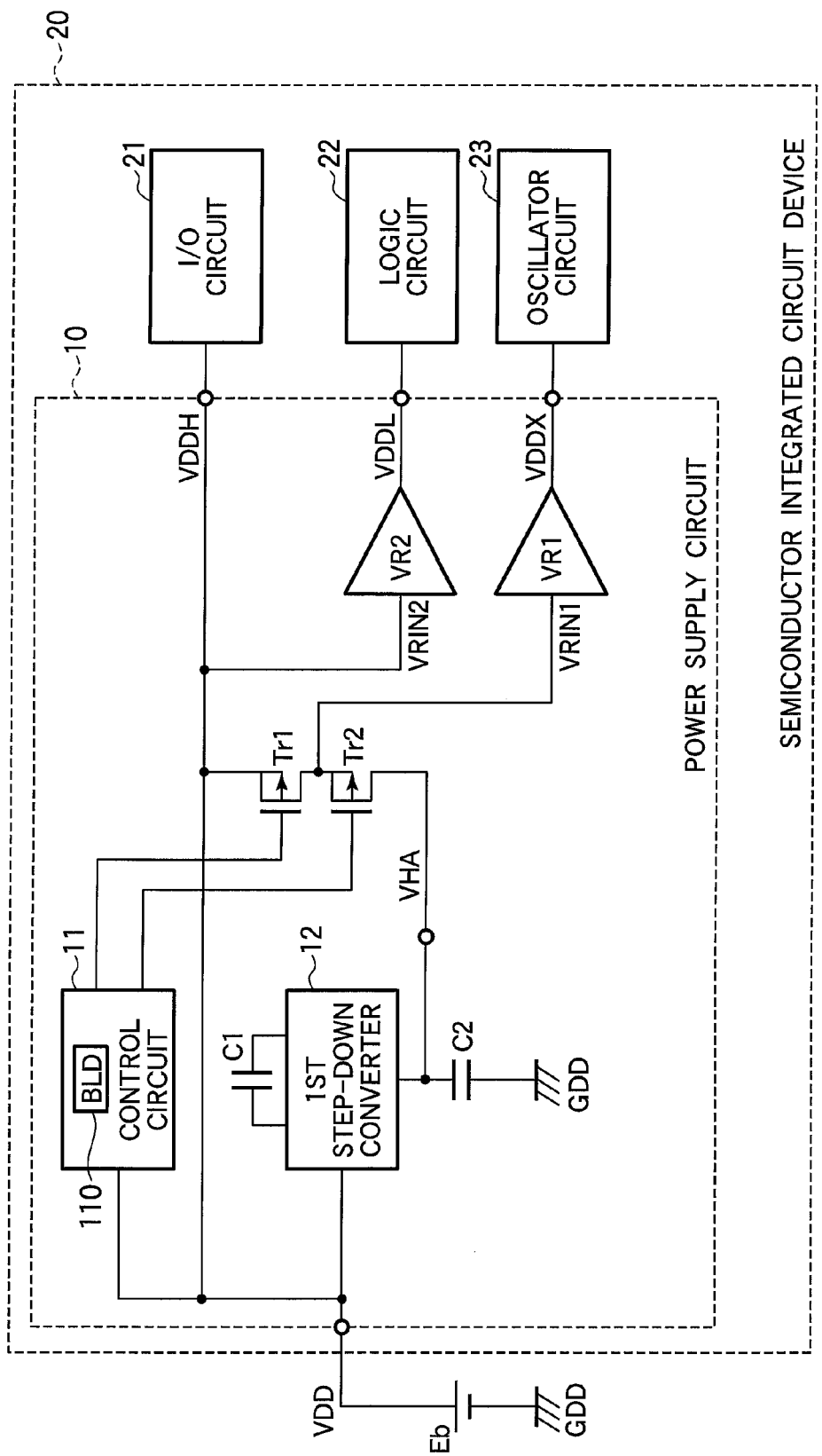
FIG. 4 is a block diagram illustrating a variation of the first embodiment.

A variation of the first embodiment, shown in FIG. 4, differs from the structure shown in FIG. 1 in that the input terminal VRIN2 of voltage regulator VR2 is connected directly to the external voltage terminal VDD. The reference level in the battery level detector 110 is set to the level at which the halved voltage produced at voltage terminal VHA becomes too low or too unstable for voltage regulator VR1 to maintain the voltage required by the oscillator circuit 23. This reference level may be lower than the reference level used in FIG. 1. As long as the battery voltage remains above this reference level, the control circuit 11 switches transistor Tr2 on and transistor Tr1 off to supply the halved voltage from voltage terminal VHA to voltage regulator VR1. When the battery voltage falls below the reference level, the control circuit 11 switches transistor Tr2 off and transistor Tr1 on to supply the battery voltage from voltage terminal VDD to voltage regulator VR1. The voltage output from voltage regulator VR1 is supplied through voltage terminal VDDX to the oscillator circuit 23. Because the oscillator circuit 23 is normally powered from only half the battery voltage, as viewed from voltage terminal VDD, the current consumption of the oscillator circuit 23 is reduced by half.

Because voltage regulator VR2 is connected directly to voltage terminal VDD, the input terminal VRIN1 of voltage regulator VR2 always receives the battery voltage from voltage terminal VDD, regardless of the remaining battery charge. Voltage regulator VR2 supplies a regulated voltage derived from the VDD voltage through voltage terminal VDDL to the logic circuit 22.

In the variation in FIG. 4 the current consumption of the oscillator circuit 23 can be halved even if a battery with a low voltage rating, such as 1.2 to 1.55 V, is used. As the oscillator circuit 23 forms the basis of clock signals supplied to the entire semiconductor integrated circuit device, the current consumption of the whole semiconductor integrated circuit device can be significantly reduced. In the circuit shown in FIG. 1, a battery rating of 1.2 V or 1.55 V would be too low for the logic circuit 22 to operate on half the battery voltage, so it would be necessary to supply the full battery voltage to the voltage regulators of both the logic circuit 22 and oscillator 23, and current consumption could not be reduced.

Second Embodiment

Figure 5:
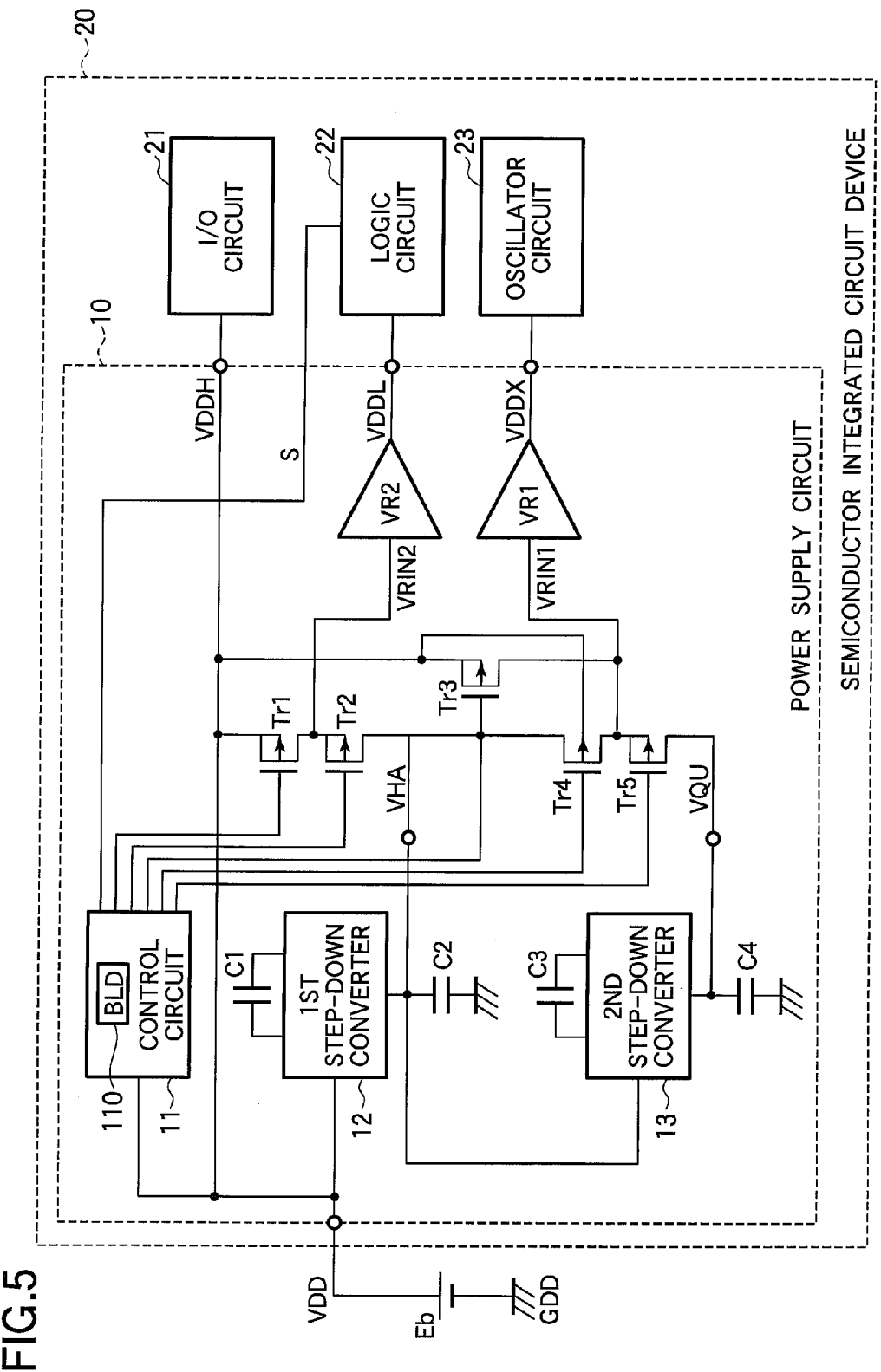
FIG. 5 is a block diagram showing the overall structure of a semiconductor integrated circuit device including a power supply circuit in a second embodiment of the invention.

Referring to FIG. 5, the power supply circuit 10 in the second embodiment differs from the first embodiment shown in FIG. 1 in having a second step-down converter 13 and three additional transistors (P-MOSFETs) Tr1, Tr4, and Tr5. The structure of the power supply circuit 10 in the second embodiment, insofar as it differs from the first embodiment, is described below.

The control circuit 11 outputs control signals to the gates of transistors Tr1 to Tr5. These signals switch transistors Tr1 to Tr5 on and off depending on the battery voltage, which the control circuit 11 now compares with at least two different reference voltages. The control circuit 11 is also interfaced to the logic circuit 22 by a signal S, and operates differently depending on the mode of operation of the logic circuit 22, as described below.

The second step-down converter 13 is a switched capacitor voltage converter with a step-down ratio of one-half; it inputs the voltage supplied from voltage terminal VHA and outputs a halved voltage to a voltage terminal VQU. The second step-down converter 13 is connected to a charging capacitor C3 and to one plate of a smoothing capacitor C4. The other plate of smoothing capacitor C4 is connected to ground. The internal structure of the second step-down converter 13 is similar to the internal structure of the first step-down converter 12, shown in FIGS. 3A and 3B.

The first and second step-down converters 12, 13 may be regarded as a single step-down converter that outputs two stepped-down voltage levels.

As in the first embodiment, transistor Tr1 has its source connected to voltage terminal VDD and transistor Tr2 has its drain connected to voltage terminal VHA. The drain of transistor Tr1 is connected to the source of transistor Tr2 at a node that is also connected to the input terminal VRIN2 of voltage regulator VR2.

Transistor Tr4 has its source connected to voltage terminal VHA and transistor Tr5 has its drain connected to voltage terminal VQU. The drain of transistor Tr4 and the source of transistor Tr5 are interconnected at a node connected to the input terminal VRIN1 of voltage regulator VR1.

Transistor Tr3 has its source connected to voltage terminal VDD and its drain connected to the input terminal VRIN1 of voltage regulator VR1. The drain of transistor Tr3 is therefore also connected to the drain of transistor Tr4 and the source of transistor Tr5.

The source lead of transistor Tr3 is connected to the bulk substrate of transistor Tr4 as well as the bulk substrate of transistor Tr3, so the substrates of both transistors Tr3 and Tr4 are biased at the VDD voltage level. The reason for this is that when transistor Tr3 is turned on and transistor Tr4 is turned off, the voltage at the input terminal VRIN1 of voltage regulator VR1 and at the p-type drain of transistor Tr4 is pulled up to the VDD level, which is twice as high as the VHA level. If the n-type bulk substrate of transistor Tr4 were to be connected to voltage terminal VHA, a forward bias would be created, setting up an unwanted current path from the input terminal VRIN1 of voltage regulator VR1 to voltage terminal VHA. With the bulk substrate of transistor Tr4 biased at the VDD level, this unwanted current path is not formed.

When the voltage of the battery Eb is sufficiently high (e.g., 2.6 to 3 V), that is, when the battery has sufficient remaining charge, the control circuit 11 switches transistors Tr2 and Tr5 on and transistors Tr1, Tr3, and Tr4 off. In this state, the voltage at voltage terminal VHA is supplied to the input terminal VRIN2 of voltage regulator VR2, and the voltage at voltage terminal VQU is supplied to the input terminal VRIN1 of voltage regulator VR1. The voltage at voltage terminal VHA is half the voltage at voltage terminal VDD, and the voltage at voltage terminal VQU is half the voltage at voltage terminal VHA, so the voltage at voltage terminal VQU is one quarter of the voltage at voltage terminal VDD.

The voltage supplied from voltage terminal VQU to the input terminal VRIN1 of voltage regulator VR1 is regulated by voltage regulator VR1 and drives the oscillator circuit 23 through voltage terminal VDDX. Compared with the first embodiment, in which the oscillator circuit 23 is driven from voltage terminal VHA, the current consumption of the whole integrated circuit device is reduced because the current consumption of the oscillator circuit 23 is reduced by a factor of four instead a factor of two.

If the battery charge begins to run low and the battery voltage drops below the level at which the logic circuit 22 can operate on the voltage supplied from voltage terminal VHA (below 2.6 V, for example), the control circuit 11 switches transistor Tr2 off and transistor Tr1 on, to supply the voltage at voltage terminal VDD to the input terminal VRIN1 of voltage regulator VR2. If the voltage at voltage terminal VQU also becomes too low or unstable, the control circuit 11 also switches transistor Tr5 off and transistor Tr4 on, to supply the voltage at voltage terminal VHA to the input terminal VRIN1 of voltage regulator VR1.

If the battery voltage drops further, the control circuit 11 switches transistor Tr4 off and transistor Tr3 on, to supply the voltage at voltage terminal VDD to the input terminal VRIN1 of voltage regulator VR1. This type of further drop in the battery voltage level may occur when the logic circuit 22 operates in a mode that places a heavy drain on the battery when the battery voltage is already 2.6 V or below. One example of such a mode, when the semiconductor integrated circuit device 20 is used in a clock or watch, is a quick display scrolling mode in which the hands of the clock or watch move continuously. The control circuit 11 is notified of this mode by the interface signal S from the logic circuit 22. The control circuit 11 switches transistor Tr3 on and transistors Tr4 off when signal S indicates that the load on the logic circuit 22 is higher than a predetermined level. Accordingly, even when the remaining battery charge becomes quite low, the voltage needed to drive the oscillator circuit 23 can still be supplied.

Third Embodiment

Figure 6:
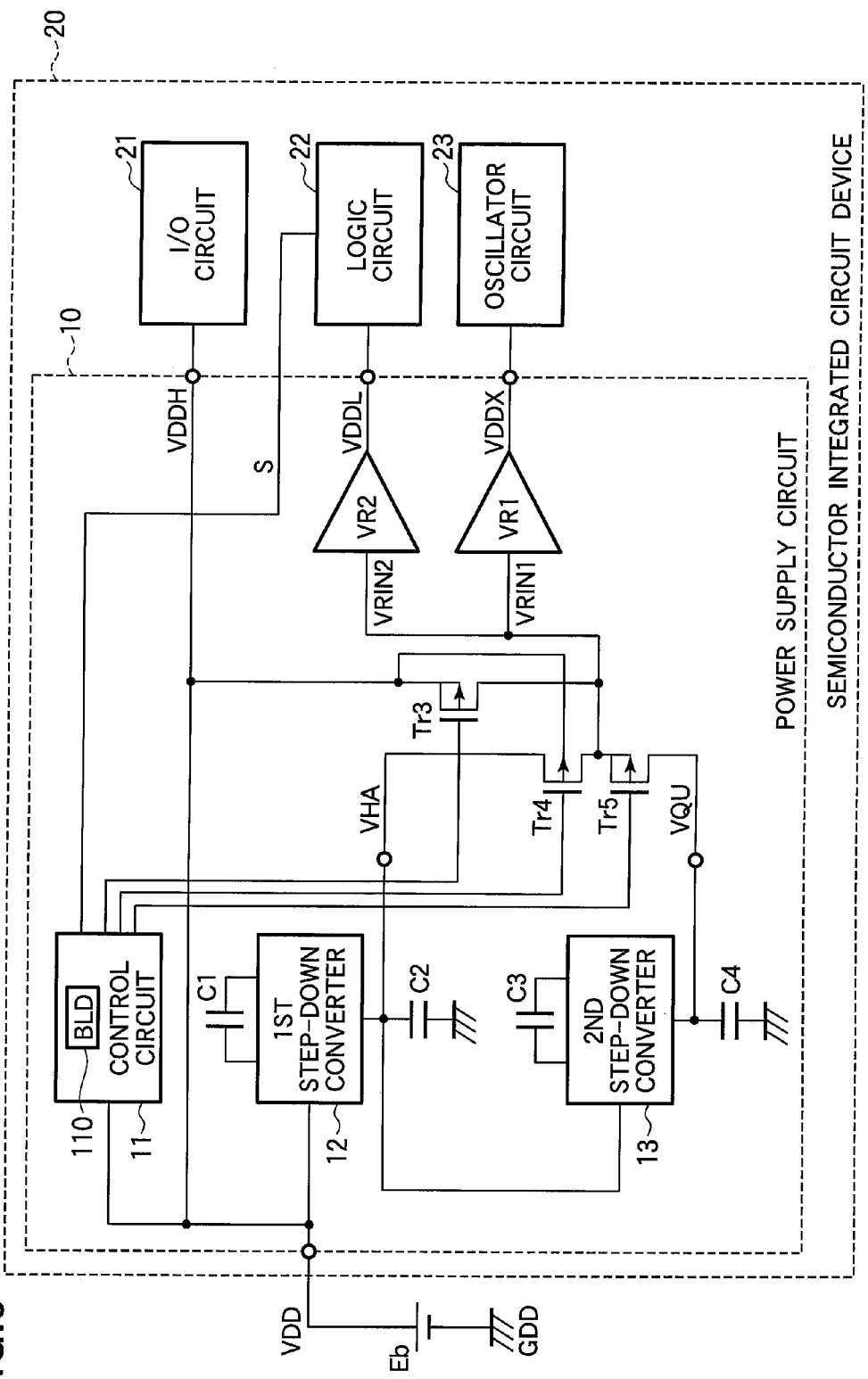
FIG. 6 is a block diagram showing the overall structure of a semiconductor integrated circuit device including a power supply circuit in a third embodiment of the invention.

Referring to FIG. 6, the power supply circuit 10 in the third embodiment differs from the second embodiment shown in FIG. 5 in that transistors Tr1 and Tr2 are removed. The structure of the power supply circuit 10 in the third embodiment, insofar as it differs from the second embodiment, is described below.

Like the input terminal VRIN1 of voltage regulator VR1, the input terminal VRIN2 of voltage regulator VR2 is connected to the node at which transistors Tr4 and Tr5 are interconnected. When the control circuit 11 switches on transistor Tr3, Tr4, or Tr5, the voltage supplied to the input terminals VRIN1, VRIN2 of both voltage regulators is switched to the voltage at voltage terminal VDD, VHA, or VQU, respectively.

When the battery voltage level is sufficiently high, the control circuit 11 switches transistor Tr5 on and transistors Tr3 and Tr4 off to supply the voltage at voltage terminal VQU to the input terminals VRIN1 and VRIN2 of the voltage regulators. As in the second embodiment, the voltage at voltage terminal VQU is one-quarter the battery voltage of the battery Eb received at voltage terminal VDD.

If the battery charge drops to the point where the voltage at voltage terminal VQU cannot be maintained at the level necessary to operate the logic circuit 22 or oscillator circuit 23, the control circuit 11 switches transistor Tr5 off and transistor Tr4 on to supply the voltage at voltage terminal VHA to the input terminals VRIN1, VRIN2 of the voltage regulators. If the battery charge drops still further and the voltage at voltage terminal VHA cannot be maintained at the necessary level, the control circuit 11 switches transistor Tr4 off and transistor Tr3 on to supply the voltage at voltage terminal VDD to the input terminals VRIN1, VRIN2 of the voltage regulators. An adequate voltage is thereby supplied to the oscillator circuit 23 and logic circuit 22 through both early and late stages of battery discharge.

In the third embodiment, when the battery has sufficient remaining charge, the oscillator circuit 23 and the logic circuit 22 are driven at one quarter of the battery voltage, and their current consumption is reduced by a factor of four. In comparison with the first embodiment, the current consumption of both the logic circuit 22 and the oscillator circuit 23 is reduced by a factor of two. In comparison with the second embodiment, the current consumption of the logic circuit 22 is reduced by a factor of two.

In addition to extending battery life and reducing current consumption, the embodiments described above also enable a semiconductor integrated circuit device to operate efficiently on batteries with various different voltage ratings. As noted above, for example, a battery with a low voltage rating such as 1.2 V to 1.55 V can be used because the control circuit 11 supplies this voltage, instead of a stepped-down voltage, directly to the logic circuit 22. The same semiconductor integrated circuit device can also operate efficiently on a battery with a voltage rating of about 3 V, however, because the control circuit 11 now selects one or more lower voltages for supply to the logic circuit 22 and oscillator circuit 23.

In the embodiments described above, functional circuits such as logic and oscillator circuits and input-output circuits are supplied with voltages that are selected separately according to an externally supplied voltage level, so that each type of circuit receives a voltage sufficient for its needs. For input-output circuitry, which requires startup control and has external interface requirements, the necessary voltage level may be the externally supplied level. For the oscillator circuit, which operates continuously and accounts for a major part of the current consumption, the necessary level may be only one quarter of the externally supplied level; a major reduction in current consumption can be achieved by operating the oscillator circuit at the one-quarter voltage level. Logic circuits can also be operated at a reduced voltage level such as one half or one quarter of the externally supplied level.

The voltage regulators VR1, VR2 in the embodiments described above may be omitted, and the voltages output by the step-down converters may be supplied directly to the appropriate functional circuits. In that case, however, the voltage supplied to a functional circuit may change abruptly when the control circuit 11 changes the transistor on/off settings. It is preferable to use voltage regulators so that battery voltage fluctuations will not subject the functional circuits to abrupt changes in their supply voltage.

In the description of the embodiments above, transistors Tr1 to Tr5 were P-MOSFETs, but these transistors may be n-type metal-oxide-semiconductor field-effect transistors (N-MOSFETs).

In the embodiments described above, the invention is applied to a battery-powered semiconductor integrated circuit device, but the invention is also useful in devices powered by other types of direct current power sources, including solar power sources.

Those skilled in the art will recognize that further variations are possible within the scope of the invention, which is defined in the appended claims.

What is claimed is:

1. A semiconductor integrated circuit device including an external power supply terminal, a power supply circuit for generating an internal supply voltage from an external supply voltage supplied to the external power supply terminal, and a first functional circuit for receiving the internal supply voltage and carrying out a prescribed circuit function, wherein the power supply circuit comprises:
- a step-down converter for receiving the external supply voltage and generating a first stepped-down voltage lower than the external supply voltage;
- a control circuit for comparing the external supply voltage with a reference voltage to provide a control signal indicative of the comparison; and
- a switch for selecting one of the external supply voltage and the first stepped-down voltage according to the control signal, and supplying the selected voltage as the internal supply voltage to the first functional circuit,
- wherein the switch comprises:
  - a transistor for receiving the first step-down voltage and outputting the first stepped-down voltage to the first functional circuit responsive to the control signal when the external supply voltage is higher than the reference voltage, and
  - another transistor for receiving the external supply voltage and outputting the external supply voltage to the first functional circuit responsive to the control signal when the external supply voltage is lower than the reference voltage.

2. The semiconductor integrated circuit device of claim 1, further comprising a second functional circuit that receives and operates on the external supply voltage.

3. The semiconductor integrated circuit device of claim 2, wherein the first functional circuit includes logic and oscillator circuitry and the second functional circuit includes input-output circuitry.

4. The semiconductor integrated circuit device of claim 2, wherein the first functional circuit includes oscillator circuitry and the second functional circuit includes input-output and logic circuitry.

5. The semiconductor integrated circuit device of claim 1, wherein the step-down converter further comprises:
- a pair of capacitors; and
- a plurality of switches for connecting the pair of capacitors alternately in series and in parallel.

6. The semiconductor integrated circuit device of claim 1, wherein the step-down converter also generates a second stepped-down voltage lower than the first stepped-down voltage, and the switch selects one of the external supply voltage, the first stepped-down voltage, and the second stepped-down voltage and supplies the selected voltage as the internal supply voltage to the first functional circuit.

7. The semiconductor integrated circuit device of claim 6, wherein the step-down converter comprises:
- a first switched capacitor circuit for receiving the external supply voltage and generating the first stepped-down voltage; and
- a second switched capacitor circuit for receiving the first stepped-down voltage and generating the second stepped-down voltage.

8. The semiconductor integrated circuit device of claim 6, wherein the control circuit receives a signal from the first functional circuit indicating whether the first functional circuit is operating in a first mode or a second mode, the first functional circuit drawing more current in the second mode than in the first mode, and:
- when the external supply voltage is higher than the reference voltage, the switch selects the second stepped-down voltage;
- when the external supply voltage is lower than the reference voltage and the first functional circuit is operating in the first mode, the switch selects the first stepped-down voltage; and
- when the external supply voltage is lower than the reference voltage and the first functional circuit is operating in the second mode, the switch control circuit selects the external supply voltage.

9. The semiconductor integrated circuit device of claim 8, wherein the first functional circuit includes logic and oscillator circuitry.

10. A semiconductor integrated circuit device including an external power supply terminal, a power supply circuit for generating an internal supply voltage from an external supply voltage supplied to the external power supply terminal, and a first functional circuit for receiving the internal supply voltage and carrying out a prescribed circuit function, wherein the power supply circuit comprises:
- a step-down converter for receiving the external supply voltage and generating a first stepped-down voltage lower than the external supply voltage; and
- a control circuit for comparing the external supply voltage with a reference voltage, selecting one of the external supply voltage and the first stepped-down voltage according to a result of the comparison, and supplying the selected voltage as the internal supply voltage to the first functional circuit,
- wherein the control circuit selects the first stepped-down voltage when the external supply voltage is higher than the reference voltage and selects the external supply voltage when the external supply voltage is lower than the reference voltage,
- wherein the step-down converter also generates a second stepped-down voltage lower than the first stepped-down voltage, and the control circuit selects one of the external supply voltage, the first stepped-down voltage, and the second stepped-down voltage and supplies the selected voltage as the internal supply voltage to the first functional circuit,
- wherein the semiconductor integrated circuit device further comprises a second functional circuit, and
- wherein the control circuit receives a signal from the first functional circuit indicating whether the first functional circuit is operating in a first mode or a second mode, the first functional circuit drawing more current in the second mode than in the first mode, and:
  - when the external supply voltage is higher than the reference voltage, the control circuit supplies the first stepped-down voltage to the first functional circuit and supplies the second stepped-down voltage to the second functional circuit;
  - when the external supply voltage is lower than the reference voltage and the first functional circuit is operating in the first mode, the control circuit supplies the external supply voltage to the first functional circuit and supplies one of the first and second stepped-down voltages to the second functional circuit; and
  - when the external supply voltage is lower than the reference voltage and the first functional circuit is operating in the second mode, the control circuit supplies the external supply voltage to both the first and second functional circuits.

11. The semiconductor integrated circuit device of claim 10, wherein the first functional circuit includes logic circuitry and the second functional circuit includes oscillator circuitry.

12. The semiconductor integrated circuit device of claim 10, further comprising a third functional circuit that receives and operates on the external power supply voltage.

13. A power supply circuit for receiving an external supply voltage and outputting an internal supply voltage, comprising:
- a step-down converter for generating at least one stepped-down voltage from the external supply voltage;
- a control circuit for comparing the external supply voltage with a reference voltage to provide a control signal indicative of the comparison; and
- a switch for selecting one of the external supply voltage and the at least one stepped-down voltage according to the control signal, and outputting the selected voltage as the internal supply voltage,
- wherein the switch comprises:
  - a transistor for receiving the at least one stepped-down voltage and outputting one of the at least one stepped-down voltage as the internal supply voltage responsive to the control signal when the external supply voltage is higher than the reference voltage, and
  - another transistor for receiving the external supply voltage and outputting the external supply voltage as the internal supply voltage responsive to the control signal when the external voltage is lower than the reference voltage.

14. The power supply circuit of claim 13, further comprising a voltage regulator for holding the internal supply voltage at a constant value.

15. The power supply circuit of claim 13, wherein the step-down converter comprises a switched capacitor circuit.

16. The power supply circuit of claim 13, wherein the step-down converter generates a first stepped-down voltage equal to one-half the external supply voltage and a second stepped-down voltage equal to one-fourth the external supply voltage.

17. A semiconductor integrated circuit device including an external power supply terminal, a power supply circuit for generating an internal supply voltage from an external supply voltage supplied to the external power supply terminal, and a first functional circuit for carrying out circuit functions, wherein the power supply circuit comprises:
- a step-down converter configured to receive the external supply voltage and generate a first stepped-down voltage lower than the external supply voltage;
- a control circuit configured to compare the external supply voltage with a reference voltage to provide a control signal indicative of the comparison; and
- a switch configured to receive the external supply voltage and the first stepped-down voltage, and selectively output the external supply voltage or the stepped-down voltage as the internal supply voltage to the first functional circuit responsive to the control signal,
- wherein the control signal includes first and second control signals, and wherein the switch comprises:
  - a first transistor having a source connected to the external supply voltage, a gate connected to the first control signal, and a drain; and
  - a second transistor having a drain connected to the first stepped-down voltage, a gate connected to the second control signal, and a source connected to the drain of the first transistor at a node,
- wherein the internal supply voltage is provided as output from the node.

18. The semiconductor integrated circuit device of claim 17, wherein the control circuit is configured to provide the control signal to the switch to select the first stepped-down voltage when the external supply voltage is higher than the reference voltage and to select the external supply voltage when the external supply voltage is lower than the reference voltage.

* * * * *